No. 714,475. Patented Nov. 25, 1902.
H. B. GRAY.
SUGAR CANE TRASH GATHERER, CUTTER, AND SPREADER.
(Application filed Oct. 11, 1902.)
(No Model.) 3 Sheets—Sheet 1.
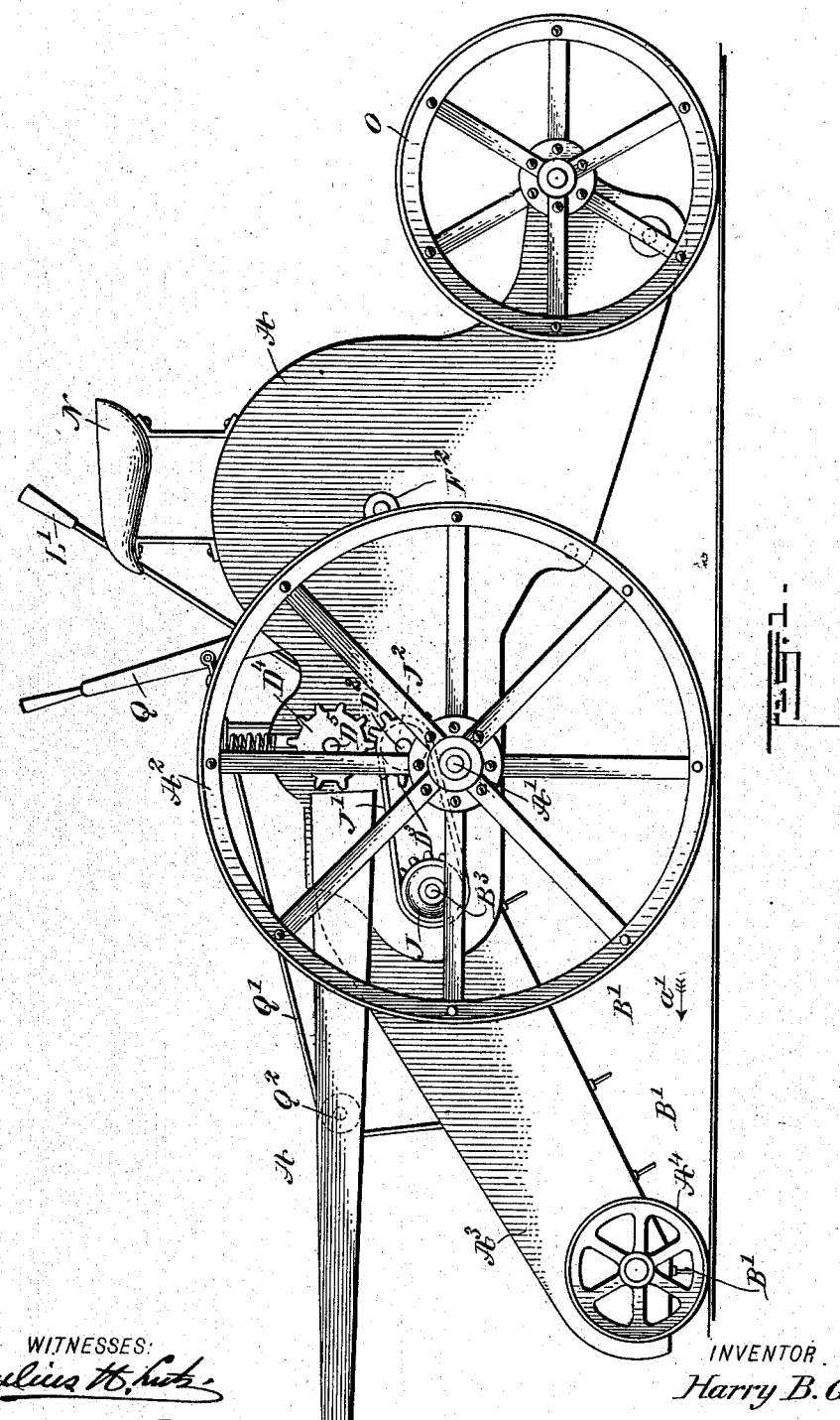
WITNESSES:
INVENTOR
Harry B. Gray
BY
ATTORNEYS.

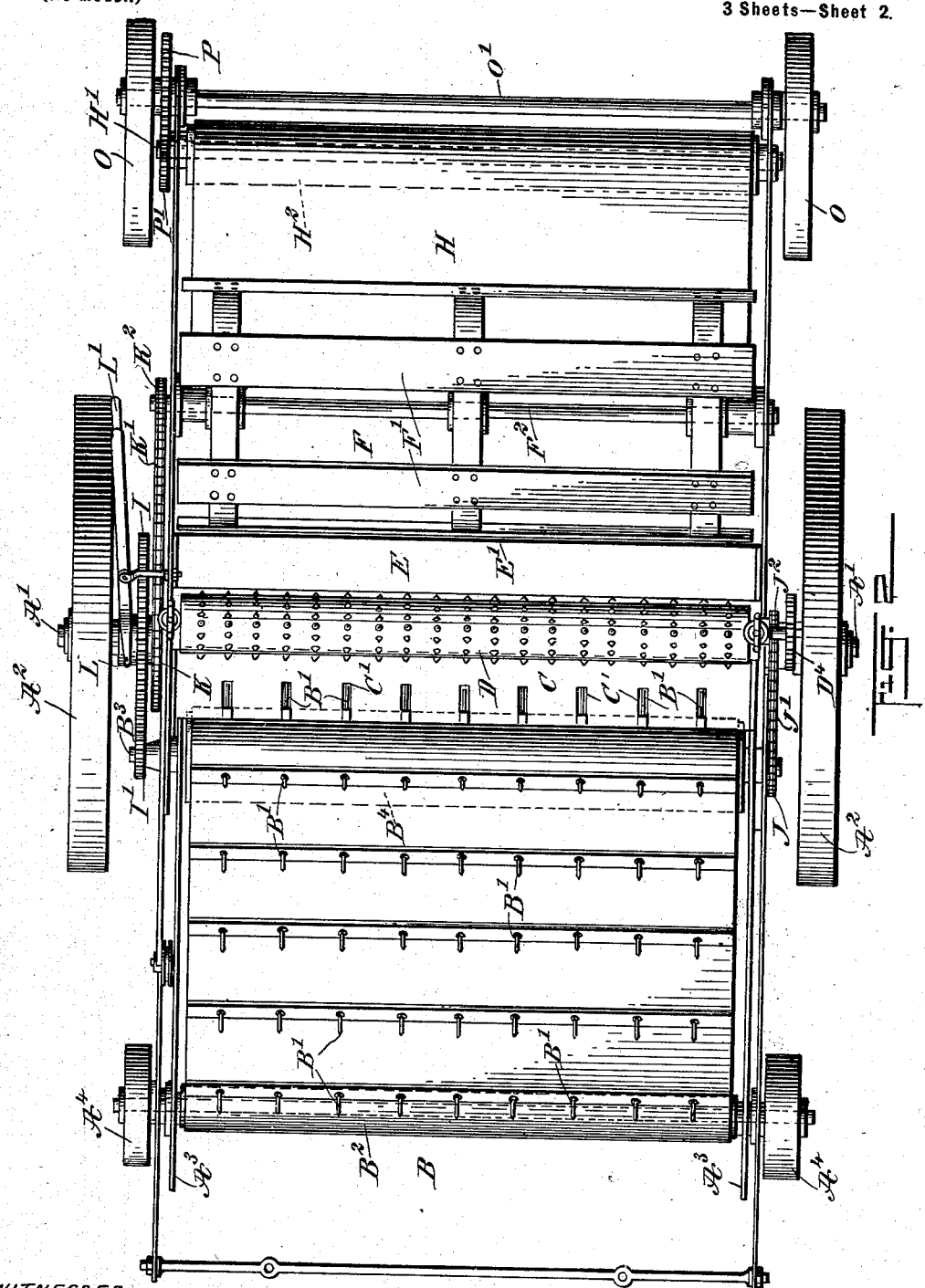

No. 714,475. Patented Nov. 25, 1902.
H. B. GRAY.
SUGAR CANE TRASH GATHERER, CUTTER, AND SPREADER.
(Application filed Oct. 11, 1902.)
(No Model.) 3 Sheets—Sheet 3.
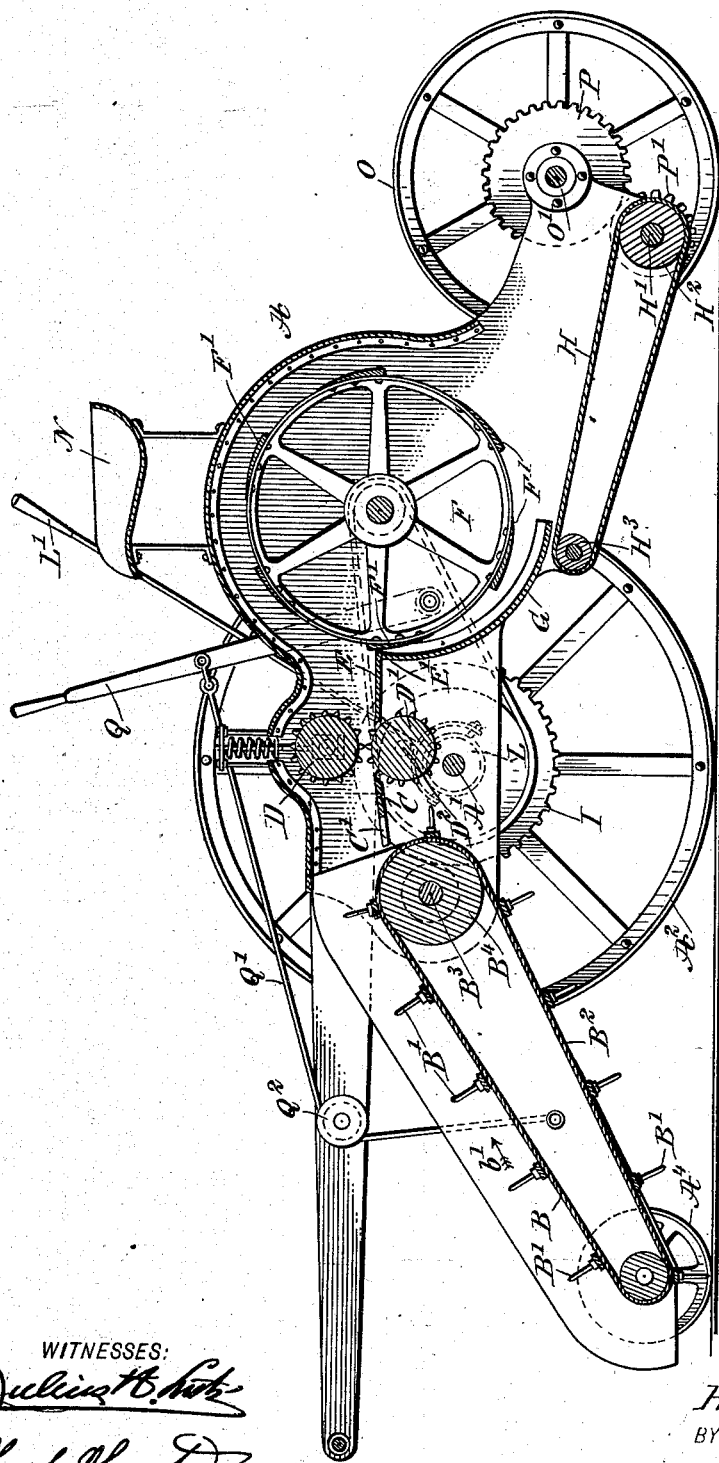
WITNESSES:
INVENTOR
Harry B. Gray
BY
ATTORNEYS.

UNITED STATES PATENT OFFICE.

HARRY BOULDERSON GRAY, OF JOHNSTONE RIVER, QUEENSLAND, AUSTRALIA.

SUGAR-CANE-TRASH GATHERER, CUTTER, AND SPREADER.

SPECIFICATION forming part of Letters Patent No. 714,475, dated November 25, 1902.

Application filed October 11, 1902. Serial No. 126,933. (No model.)

*To all whom it may concern:*

Be it known that I, HARRY BOULDERSON GRAY, a subject of the King of Great Britain, and a resident of Johnstone River, North Queensland, Australia, have invented a new and Improved Sugar-Cane-Trash Gatherer, Cutter, and Spreader, of which the following is a full, clear, and exact description.

My invention relates to agricultural machines; and its object is to provide a new and improved sugar-cane-trash gatherer, cutter, and spreader adapted to be moved over the harvested sugar-cane field to pick up all the sugar-cane trash—such as leaves, tops, and the like—left by the cane-cutters on the field, the machine cutting the picked-up trash into small pieces and then spreading the latter evenly over the ground to permit of conveniently plowing the same under, and thereby restoring to the ground some of the valuable ingredients of which it was deprived by the growing of the sugar-cane.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the figures.

Figure 1 is a side elevation of the improvement. Fig. 2 is a plan view of the same with the cover removed, and Fig. 3 is a longitudinal sectional elevation of the same.

The improved machine is mounted on a wheeled vehicle adapted to be drawn over the ground in the direction of the arrow $a'$, and the said vehicle consists, essentially, of a main frame A, having a supporting-axle $A'$, on which are secured the wheels $A^2$, traveling on the ground, and the said main frame is provided at the front with a swing-frame $A^3$, pivoted at its rear end on the sides of the main frame near the axle $A'$, and on the front end of said swing-frame $A^3$ are journaled wheels $A^4$, traveling on the ground. In the swing-frame $A^3$ is arranged an endless belt-rake B, extending upwardly and rearwardly and having rake-teeth $B'$, adapted to pick up the sugar-cane trash from the ground and carry the said trash upwardly and rearwardly to finally deliver it to a platform C, having its front edge extending close to the belt $B^2$ of the rake B and formed with slots $C'$ for the passage of the teeth $B'$ of the belt-rake B. The platform C is secured at its sides to the sides of the frame A, and the rear end of the said platform delivers the trash to and between the rollers D D′, rotating in unison and having teeth or pins on their peripheral surface for crushing the trash and feeding the same rearwardly onto and over a second platform E, likewise secured to the sides of the frame A and formed at its rear end with a knife-edge $E'$, on which the trash is cut into small pieces or shreds by knives $F'$, held on the peripheral surface of a cutter-drum F, journaled in the sides of the main frame A.

The small pieces or shreds of the trash fall into a downwardly and rearwardly extending segmental chute G, which delivers the pieces either directly onto the ground or onto an endless spreader-belt H, arranged in the rear portion of the main frame directly over the ground. This belt H discharges the cut pieces onto the ground, so that the said cut pieces can be readily plowed under.

In order to impart the necessary motion to the several operating parts of the machine, the following device is provided. On the axle $A'$ is arranged a gear-wheel I, in mesh with a pinion $I'$, secured on the shaft $B^3$ of the upper roller $B^4$ for the belt-rake B, and on the said shaft $B^3$ is secured a sprocket-wheel J, (see Fig. 2,) connected by a sprocket-chain $J'$ with a sprocket-wheel $J^2$, secured on the shaft $D^2$ for the lower roller $D'$, and this shaft $D^2$ carries a gear-wheel $D^3$, in mesh with a gear-wheel $D^4$, secured on the shaft $D^5$ of the upper roller D. Now when the machine is drawn forward and the gear-wheel I is rotated from the ground-wheels $A^2$ and axle $A'$ it is evident that a rotary motion is given by the pinion $I'$ and shaft $B^3$ to the roller $B^4$, so as to cause the belt-rake B to travel in the direction of the arrow $b'$. When this takes place, the rake-teeth $B'$ rake up the trash and carry the same upward and finally discharge the trash onto the platform C, as previously explained.

The rotary motion of the shaft $B^3$ is transmitted by the sprocket-wheels J J² and the sprocket-chain J' to the lower roller D', and as the two rollers D' and D are geared together by the gear-wheels D³ D⁴ it is evident that the trash passed between the rollers is cut and fed rearwardly by the said rollers to bring the trash onto the platform E and to the fixed knife E' and the knives F' of the revolving cutter F.

A rotary motion is given to the cutter F from the gear-wheel I by a sprocket-wheel K, rotating with the said gear-wheel and connected by a sprocket-chain K' with a sprocket-wheel K², secured on one outer end of the shaft F² of the cutter F. The gear-wheel I is mounted to rotate loosely on the axle A' and is adapted to be connected with the same by a suitable clutch L, controlled by a shifting fork L', fulcrumed on the right-hand side of the frame A and under the control of the operator seated on a seat N, supported on the main frame A.

The belt H when used is driven from rear wheels O, traveling on the ground and having their shaft O' journaled in the sides of the rear part of the main frame A. On the shaft O' is secured a gear-wheel P, in mesh with a pinion P', secured on the shaft H' of the rear lower roller H² for the spreader H, the front roller H³ of which is arranged below the lower end of the chute G.

The swing-frame A³, preferably hung loosely on the shaft B³, may be swung upward to move the wheels A⁴ out of engagement with the ground at the time the machine is drawn from one place to the other, and for this purpose the swing-frame A³ is connected with one end of a rope Q', attached to a lever Q, likewise fulcrumed on the frame A and adapted to be operated by the operator on the seat N. The rope Q' passes over a pulley Q², journaled on the forward portion of the main frame A.

The shafts D² and D⁵ of the rollers D and D' are preferably journaled in bearings pressed on by springs to allow the rollers to yield for the passage of more or less trash.

Having thus described my invention, I claim as new and desire to secure by Letters Patent—

1. A sugar-cane-trash gatherer and cutter, comprising in combination a wheeled vehicle, an endless rake for picking up the trash from the ground and carrying it upwardly and rearwardly, a pair of revoluble crushing feed-rolls, receiving the trash from the carrier, a revoluble cutter for cutting the trash fed by the rolls and means actuated from the wheels of the vehicle for operating rake, rolls, and cutter, as set forth.

2. A sugar-cane-trash gatherer and cutter, comprising in combination a wheeled vehicle, a swing-frame, arranged at the front portion of the vehicle and provided with wheels at its free end and adapted to travel upon the ground, an endless rake mounted in the swing-frame and adapted to pick up the trash from the ground and carry the same upwardly and rearwardly, a platform carried by the vehicle, adjacent to the upper end of the said rake, for receiving the trash from the latter, a pair of revoluble cutting feed-rolls, receiving the trash from the said platform, a second platform onto which the trash is delivered from the feed-rolls, the second platform having a knife-edge at its rear end, a revoluble cutter, having its knives operating in conjunction with the knife-edge on the said second platform, for cutting the trash into small pieces, and means actuated from the wheels of the vehicle for operating the rake, rolls, and cutter, as set forth.

3. A sugar-cane-trash gatherer and cutter, comprising in combination a wheeled vehicle, an endless rake for picking up the trash from the ground and carrying it upwardly and rearwardly, a pair of revoluble crushing feed-rolls, receiving the trash from the carrier, a revoluble cutter for cutting the trash fed by the rolls, a spreader-carrier onto which drop the small pieces, and which spreads the pieces evenly over the ground at the rear of the machine and means actuated from the wheels of the vehicle for operating the rake, rolls, cutter and spreader-carrier, as set forth.

4. A sugar-cane-trash gatherer and cutter, comprising in combination a wheeled vehicle, a downwardly and forwardly inclined and pivoted frame, arranged at the front portion of the vehicle and provided at its free end with wheels adapted to travel upon the ground, an endless rake mounted in the pivoted frame and adapted to pick up the trash from the ground and carry the same upwardly and rearwardly, a platform carried by the vehicle, adjacent to the upper end of the said rake, for receiving the trash from the latter, the forward edge of the platform being provided with slots for the passage of the teeth of the rake, a pair of revoluble cutting feed-rolls, receiving the trash from the said platform, a second platform onto which the trash is delivered from the feed-rolls, the second platform having a knife-edge at its rear end, a revoluble cutter, having its knives operating in conjunction with the knife-edge on the said second platform, for cutting the trash into small pieces, means actuated from the forward wheels of the vehicle for operating the rake, rolls, and cutters, a segmental chute extending downwardly and rearwardly under the said revoluble cutter, an endless spreader receiving the cut material from the chute, and means actuated by the rear wheels for operating the spreader, as set forth.

5. A sugar-cane-trash gatherer and cutter, comprising in combination a wheeled vehicle, an endless rake arranged in the front portion of the vehicle and adapted to pick up the trash from the ground and carry the same upwardly and rearwardly, a platform carried by the vehicle, adjacent to the upper end of the said rake, for receiving the trash from the latter, a pair of revoluble cutting feed-rolls, the second platform having a knife-edge at its rear end, a revoluble cutter, having its knives operating in conjunction with the knife-edge on the said second platform, for cutting the trash into small pieces, and means
5 actuated from the wheels of the vehicle, for imparting motion to the said endless rake, crushing feed-rolls and the revoluble cutter, as set forth.

In testimony whereof I have signed my name to this specification in the presence of 10 two subscribing witnesses.

HARRY BOULDERSON GRAY.

Witnesses:
   THEO. G. HOSTER,
   EVERARD BOLTON MARSHALL.